US005959301A

United States Patent [19]

Warashina

[11] Patent Number: 5,959,301

[45] Date of Patent: Sep. 28, 1999

[54] ULTRAVIOLET DETECTOR

[75] Inventor: Hidenaga Warashina, Hamamatsu, Japan

[73] Assignee: Hamamatsu Photonics K.K., Hamamatsu, Japan

[21] Appl. No.: 08/938,823

[22] Filed: Sep. 26, 1997

[30] Foreign Application Priority Data

Sep. 26, 1996 [JP] Japan .................................... 8-255080

[51] Int. Cl.[6] ................................ G01J 1/04; G01J 5/02; H01J 47/00

[52] U.S. Cl. .......................... 250/372; 250/374; 313/539; 313/542; 313/544

[58] Field of Search ..................................... 250/372, 374, 250/336.1; 313/539, 542, 544, 538

[56] References Cited

FOREIGN PATENT DOCUMENTS 49-17184 5/1974 Japan .

*Primary Examiner*—Constantine Hannaher
*Assistant Examiner*—Albert Gagliardi
*Attorney, Agent, or Firm*—Pillsbury, Madison & Sutro LLP

[57] ABSTRACT

The ultraviolet detector in accordance with the present invention comprises a sealed vessel enclosing a discharged gas therein, and a metal anode and a metal cathode which are disposed close to each other within the sealed vessel so as to generate therebetween discharge in response to ultraviolet radiation entering the sealed vessel. The anode and cathode are independently secured to the sealed vessel with a plurality (at least three pieces each) of anode pins and cathode pins, respectively. An electrically-insulating spacer is disposed between the anode and cathode so as to fix their relative positions with respect to each other, thereby defining a discharging gap, by which discharge is stably generated between these electrodes. The current resulting from the discharge is observed so as to detect the incidence of ultraviolet radiation. Since the cathode and the anode are independently fixed, they are prevented from coming into contact with each other and malfunctioning even when a shock or vibration is externally imparted to the detector.

10 Claims, 11 Drawing Sheets

DRIVING CIRCUIT OF UV DETECTOR

II - II SECTION

V - V SECTION

Ⅶ-Ⅶ SECTION

Ⅷ-Ⅷ SECTION

VII–VII SECTION

IX–IX SECTION

ULTRAVIOLET DETECTOR

BACKGROUND OF THE INVENTION

1. Field of the Invention

The present invention relates to an ultraviolet detector and, in particular, a detector that detects weak ultraviolet radiation emanating from a flame.

2. Related Background Art

An example of such a kind of ultraviolet detectors which have conventionally been used in general employs a configuration shown in FIG. 17. This ultraviolet detector 100 comprises a sealed vessel 101 made of ultraviolet-transparent glass. Within the sealed vessel 101, a planar anode 102 and a planar cathode 103, which oppose each other, are disposed in parallel with each other. The anode 102 is secured to an anode pin 105 penetrating through a stem 104 of the sealed vessel 101, whereas the cathode 103 is secured to a cathode pin 106. Formed between the anode 102 and the cathode 103 is a discharging gap 107 of about 0.4 mm. The voltage between the anode 102 and the cathode 103 is set to a level which is higher than the lowest voltage that induces discharge therebetween in response to incident ultraviolet radiation and at which no spontaneous discharge occurs when there is no incident ultraviolet radiation. A discharged gas is enclosed within the sealed vessel 101.

When a trace amount of ultraviolet radiation emanating from a flame is incident on the sealed vessel 101, the incident ultraviolet radiation passes through a grid-like ultraviolet-transmitting opening 102*a* formed in the anode 102 and then impinge on the surface of the cathode 103, whereby photoelectrons are emitted from the cathode 103. Thus generated photoelectrons are accelerated toward the anode 102 due to an electric field and collide with molecules of the gas between the anode 102 and the cathode 103, thereby causing an electron avalanche. Due to this electron avalanche, a number of cations are generated between the electrodes 102 and 103. These cations are accelerated toward the cathode 103 by the electric field and collide with the surface of the cathode 103, whereby a number of secondary electrons are emitted therefrom. Like the photoelectrons, the secondary electrons generate electron avalanches, whereby discharge is formed between the electrodes 102 and 103 thereafter. When the current resulting from the discharge is observed, the incidence of ultraviolet radiation, i.e., existence of the flame, is detected.

In the conventional ultraviolet detectors, however, due to the above-mentioned configuration, there have been the following problems.

Namely, since the discharging gap 107 between the anode 102 and the cathode 103 is quite narrow, the sensitivity in detection may fluctuate even when a slight aberration occurs in this gap. In the event that a shock or vibration is imparted to the detector 100 itself, the anode 102 and the cathode 103 may come into contact with each other, thus disabling its normal operation. Here, Japanese Utility Model Publication No. 49-17184 discloses an example of conventional ultraviolet detectors.

SUMMARY OF THE INVENTION

In order to overcome the foregoing problems, it is an object of the present invention, in particular, to provide an ultraviolet detector having a stable sensitivity for detecting ultraviolet radiation.

The ultraviolet detector in accordance with the present invention comprises a sealed vessel enclosing a discharged gas therein, and a metal anode and a metal cathode which are disposed close to each other within the sealed vessel so as to generate therebetween discharge in response to ultraviolet radiation entering the sealed vessel, wherein each of the anode and cathode is independently secured to at least three points in the sealed vessel which do not lie on a single straight line, and wherein an electrically-insulating spacer is disposed between the anode and the cathode so as to define their relative positions with respect to each other.

In this ultraviolet detector, since the electrically-insulating spacer is disposed between the anode and the cathode, they are prevented from electrically connecting with each other, and the very narrow discharging gap therebetween can always be held constant. Due to such a configuration, discharge is stably generated between the electrodes, and the incidence of ultraviolet radiation is detected when the current resulting from the discharge is observed. Even in the event that a shock or vibration is imparted to the detector from the outside, the spacer prevents the cathode and the anode from coming into contact with each other and malfunctioning.

Preferably, the top portion of the sealed vessel is provided with an ultraviolet entrance window, the sealed vessel includes a tubular member made of a metal, and the bottom portion of the sealed vessel is closed with a stem. In the case where such a configuration is employed, ultraviolet radiation enters only through the ultraviolet entrance window at the top portion of the sealed vessel, whereby a field of view within the range of 120° to 160° can be attained. Accordingly, it is easily applied to a competent fire alarm or the like. Also, since the metal tubular member is employed, a highly shock-resistant structure can be attained, thus making it easier to handle.

Preferably, the anode is disposed on the ultraviolet entrance window side, the cathode is disposed on the stem side, the anode is formed like a disk having an ultraviolet-transmitting region at its center portion, the cathode has an ultraviolet-receiving region opposing the ultraviolet-transmitting region, the ultraviolet-transmitting region has a plurality of ultraviolet-transmitting holes, and the ultraviolet-receiving region is formed at the top portion of a cup-shaped protrusion adjacent to the ultraviolet-transmitting region. When the ultraviolet-receiving region of the cathode is thus formed at the top portion of the cup-shaped protrusion, the ultraviolet-receiving region of the cathode can securely be disposed close to the ultraviolet-transmitting region of the anode in a simple configuration.

Preferably, a ring-shaped spacer is held between edges of the anode and cathode, while the discharging gap between the anode and cathode is made smaller than the thickness of the spacer. When the spacer is formed like a ring, a discharging region can be made at its center portion, whereby creeping discharge can be prevented from occurring on the spacer surface.

Preferably, the center portion of the ring-shaped spacer has an opening into which the protrusion is inserted. When such a configuration is employed, the spacer can be disposed around the protrusion.

In this case, it is preferred that an auxiliary spacer be disposed between the stem and the cathode. When such a configuration is employed, the seating characteristic of the cathode can be improved by the auxiliary spacer, whereby the cathode and the stem can securely be separated from each other.

Preferably, the center portion of the auxiliary spacer is provided with a positioning opening which engages with a protruded portion of a tube projecting from the stem. When such a configuration is employed, the auxiliary spacer can securely be positioned.

Of the auxiliary spacer, the surface on the stem side is preferably provided with a cross-shaped vent hole communicating with the positioning opening. When such a configuration is employed, a gas passage can be formed between the stem and the cathode.

Preferably, an anode pin and a cathode pin penetrate through the stem so as to be secured thereto, an edge portion of the anode is provided with a positioning hole for inserting the anode pin, the edge portion of the cathode is provided with a positioning hole for inserting the cathode pin, and the edge portion of the spacer is provided with a positioning hole through which the anode pin penetrates. When such a configuration is employed, it becomes quite easy to assemble the ultraviolet detector, and its assembling cost is lowered.

Preferably, the spacer is provided with a depression for preventing the end portion of the cathode pin from abutting thereto. When such a configuration is employed, the cathode pin does not abut to the spacer, whereby the spacer can securely be disposed between the electrodes.

Preferably, the outermost periphery of the stem is constituted by a metal cylinder, and the metal cylinder is provided with a flange which abuts to the end portion of the metal tubular member. When such a configuration is employed, the tubular member and the stem can easily be connected to each other, thus facilitating the assembling of the ultraviolet detector.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, preferred embodiments of the ultraviolet detector in accordance with the present invention will be explained in detail with reference to the accompanying drawings.

Figure 1:
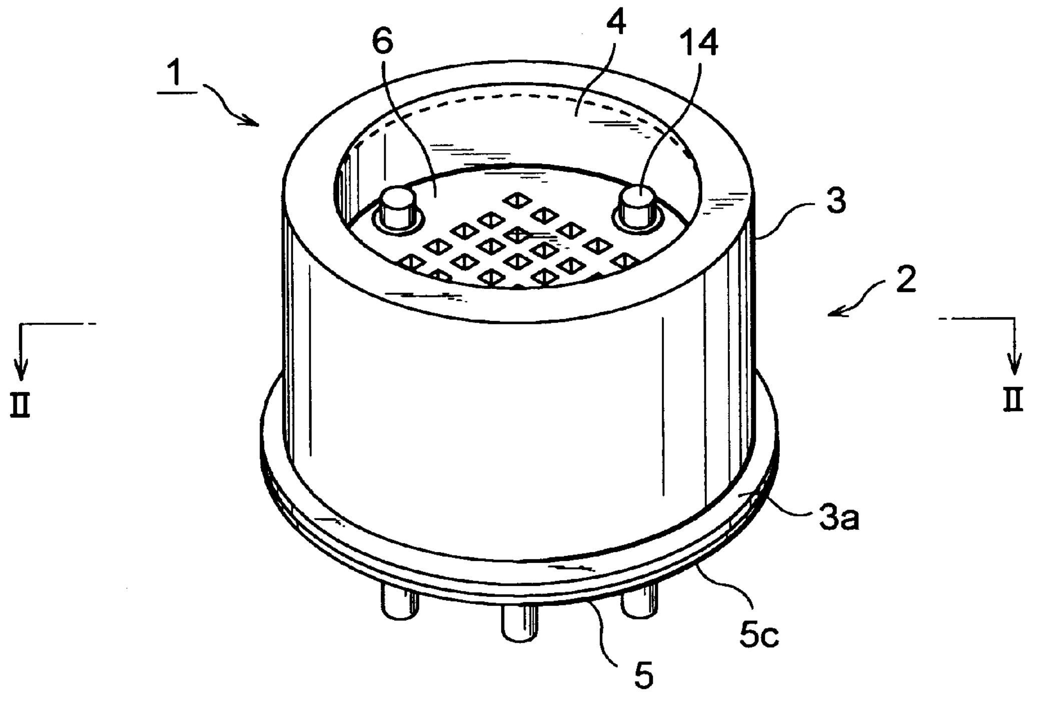
FIG. 1 is a perspective view showing the exterior of an ultraviolet detector in accordance with a first embodiment of the present invention.
Figure 2:
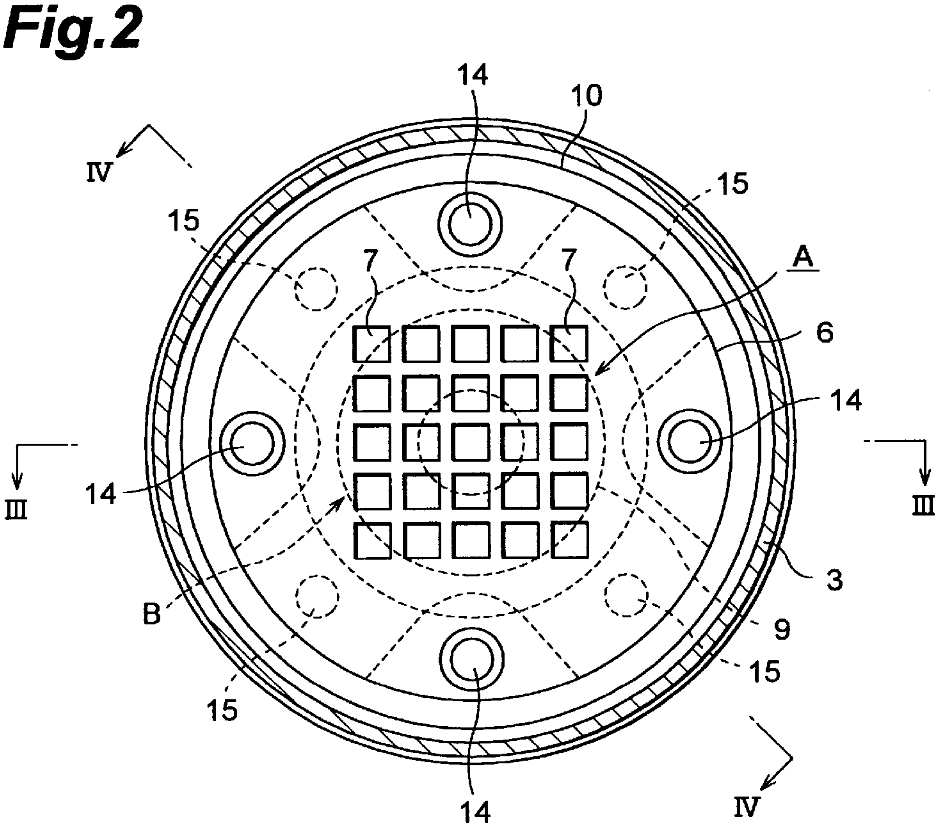
FIG. 2 is a sectional view of the ultraviolet detector taken along line II—II of FIG. 1.

FIG. 1 is a perspective view showing the exterior of the ultraviolet detector in accordance with a first embodiment of the present invention. The ultraviolet detector 1 shown in this drawing includes a sealed vessel 2 in a cylindrical form. The sealed vessel 2 comprises a cylindrical tubular member 3 made of a metal (covar metal); an ultraviolet entrance window 4 which is made of UV-transparent glass and is secured to the top portion of the tubular member 3 by fusion-bonding; and a stem 5 secured to the bottom portion of the tubular member 3.

As shown in FIGS. 2 to 5, disposed within the sealed vessel 2 is a disk-shaped anode 6 opposing the ultraviolet entrance window 4. The anode 6 is made of a nickel material of high purity and is disposed in parallel with the ultraviolet entrance window 4. The center portion of the anode 6 is provided with rectangular ultraviolet-transmitting holes 7 arranged in a matrix of 5 by 5. The ultraviolet-transmitting holes 7 constitute an ultraviolet-transmitting region A. Disposed on the side of the stem 5 within the sealed vessel 2 is a cathode 8 made of a nickel material of high purity. The center portion of the cathode 8 is provided with an ultraviolet-receiving region B opposing the ultraviolet-transmitting region A of the anode 6. This ultraviolet-receiving region B is disposed at the top portion of a cup-shaped protrusion 9, which is formed at the center portion of the cathode 8 by drawing or the like, so as to be positioned close to the ultraviolet-transmitting region A of the anode 6.

Formed between the ultraviolet-transmitting region A and the ultraviolet-receiving region B is a predetermined discharging gap C. Here, the discharging gap C is formed as a very small gap of 0.4 mm between the planar anode 6 and cathode 8. Accordingly, the discharging gap C may be closed upon vibration or heat. Also, in order to keep the accuracy in ultraviolet detection, a high precision is required for the discharging gap C. Namely, the discharging gap C cannot be used when it is too broad or too narrow. In order to manually make this gap C, a lot of skill is required, and a high technique is desired.

Therefore, an electrically-insulating spacer 10 is disposed between the anode 6 and the cathode 8, thereby securely defining the discharging gap C between the anode 6 and the cathode 8. The spacer 10 is made of ceramics coated with silica ($SiO_2$) and, in order to improve an insulating effect between the anode 6 and the cathode 8, is formed as a ring-shaped member having a predetermined thickness H. The spacer 10 has an insulating portion 10*a* which is held between an annular edge portion 6*a* of the anode 6 and an edge portion 11*a* of a brim 11 extending, like a cross, from the lower end of the protrusion 9 of the cathode 8, whereby the distance between the anode 6 and the cathode 8 is always held constant (see FIG. 4). As a result, the discharging gap C is also held constant.

Further, the center portion of the spacer 10 is provided with an opening 10*b* for accommodating the protrusion 9 of the cathode 8. The opening 10*b* has a diameter larger than that of the protrusion 9, so as not to come into contact with the protrusion 9. Also, the thickness H of the spacer 10 is set to at least four times that of the discharging gap C. Accordingly, between the anode 6 and the cathode 8, creeping discharge can appropriately be prevented from occurring on the wall face of the opening 10*b* in particular. Further, since a silica ($SiO_2$) layer is formed on the surface of the spacer 10, an improved effect for preventing the creeping discharge is exhibited.

The stem 5 is provided with a substrate 5*a* which is made of covar glass and is formed like a disk. Secured to the substrate Sa is a cylinder 5*b* made of a metal (covar metal) constituting the outermost periphery of the stem 5. Secured to the center portion of the stem 5 is a metal tube 12 for evacuating air from the sealed vessel 2 and injecting a discharged gas (a reducing mixed gas) therein at the time when the ultraviolet detector 1 is being assembled. The inner end of the tube 12 forms a protruded portion 12*a* slightly projecting toward the inside of the sealed vessel 2 from the stem 5. The tube 12 is opened when the ultraviolet detector 1 is being assembled, and is closed by pinch sealing after the assembling is completed.

Also, within the sealed vessel 2, an auxiliary spacer 13 made of ceramics is disposed between the stem 5 and the cathode 8. The center portion of the auxiliary spacer 13 is provided with a positioning opening 13*a* having a diameter slightly greater than the outside diameter of the tube 12. Accordingly, when the positioning opening 13*a* of the auxiliary spacer 13 and the protruded portion 12*a* of the tube 12 mate with each other, the auxiliary spacer 13 is securely positioned on the stem 5 without obstructing a gas inlet 12*b* of the tube 12. Also, since the auxiliary spacer 13 is disposed between the stem 5 and the cathode 8, the cathode 8 attains an improved seating characteristic with respect the stem 5, while the cathode 8 and the stem 5 can securely be separated from each other. Also, as shown in FIGS. 4 to 6, the surface of the auxiliary spacer 13 opposing the stem 5 is provided with a cross-shaped vent hole 13*b*, which secures a gas passage between the stem 5 and the cathode 8.

Figure 3:
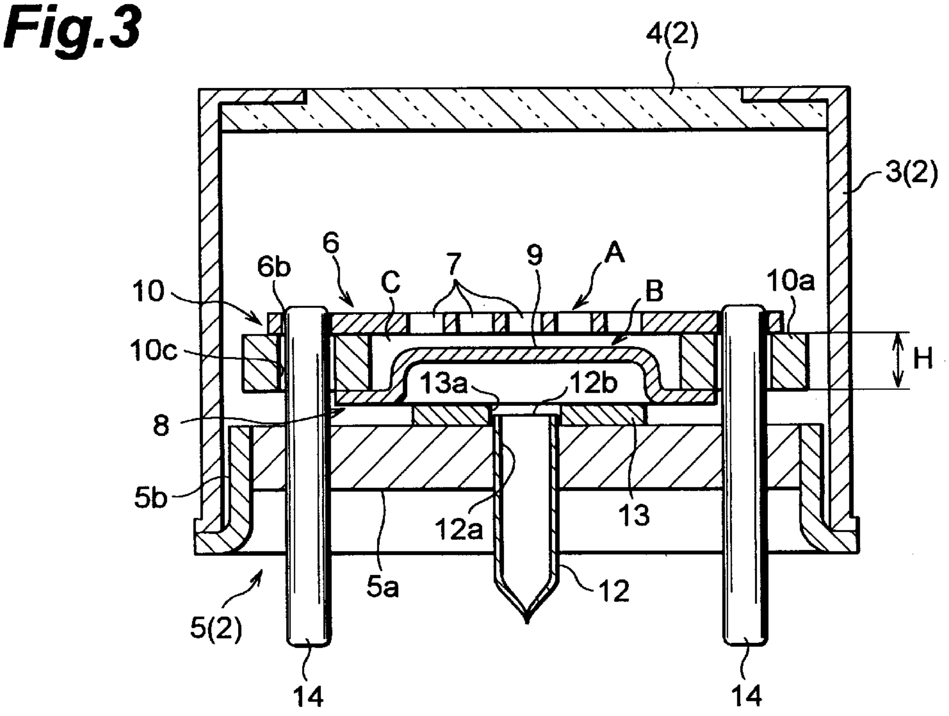
FIGS. 3 and 4 are sectional views of the ultraviolet detector taken along line III—III and line IV—IV of FIG. 2, respectively.
Figure 4:
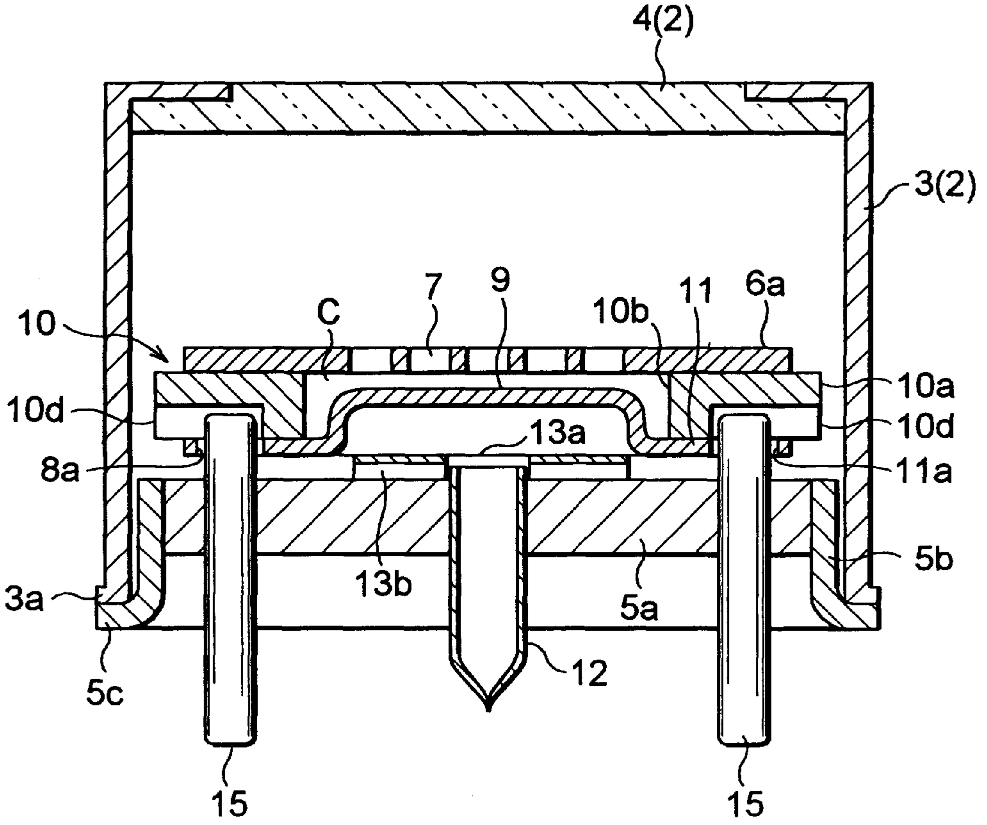
Figure 5:
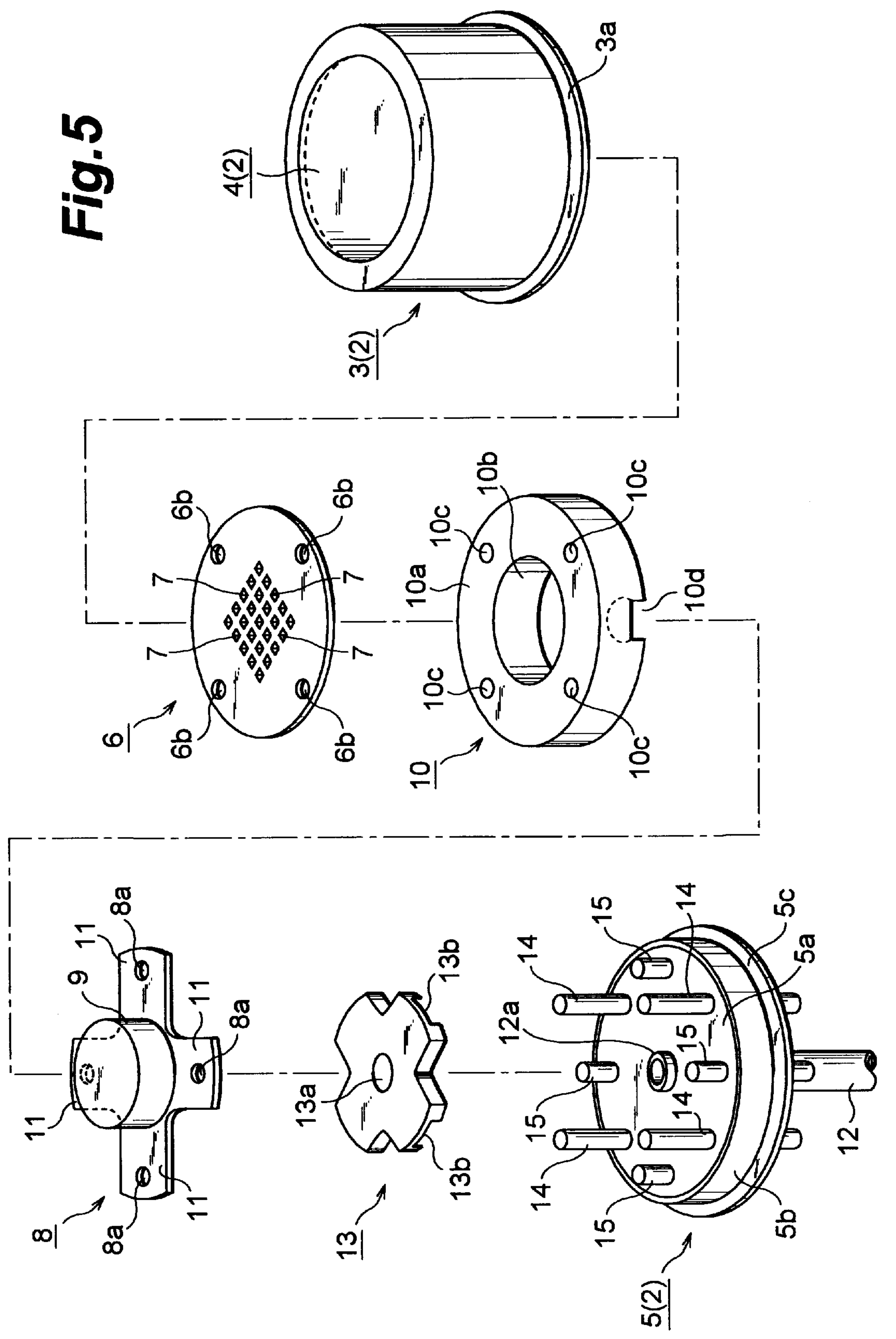
FIG. 5 is an exploded perspective view of the ultraviolet detector shown in FIG. 1.
Figure 6:
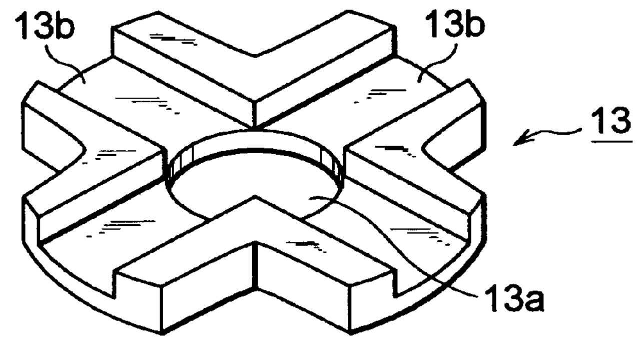
FIG. 6 is a perspective view showing an auxiliary spacer employed in the ultraviolet detector in accordance with the present invention.

As shown in FIGS. 3 to 5, four pieces each of long anode pins 14 and short cathode pins 15, each made of a covar metal, alternately penetrate through and are secured to the substrate 5*a* of the stem 5. The anode pins 14 are respectively inserted into four positioning holes 6*b* formed at the edge portion 6*a* of the anode 6, whereas the cathode pins 15 are respectively inserted into four positioning holes 8*a* formed at the edge portion 11*a* of the cathode 8. Further, the insulating portion 10*a* constituting the edge portion of the spacer 10 is provided with four positioning holes 10*c* through which the anode pins 14 respectively penetrate. After the cathode pins 15 are inserted into their corresponding positioning holes 8*a* of the cathode 8, the cathode 8 is laser-welded to the cathode pins 15. Subsequently, the anode pins 14 are inserted into their corresponding positioning holes 10*c* of the spacer 10 and then into their corresponding positioning holes 6*b* of the anode 6. Thereafter, the anode 6 is laser-welded to the anode pins 14. As a result, the spacer 10 can securely be held between the anode 6 and the cathode 8. Since each of the anode 6 and cathode 8 is independently fixed at its surrounding four points, their respective spatial positions can securely be defined, whereby they can be disposed in parallel with each other with a predetermined distance therebetween.

Figure 7:
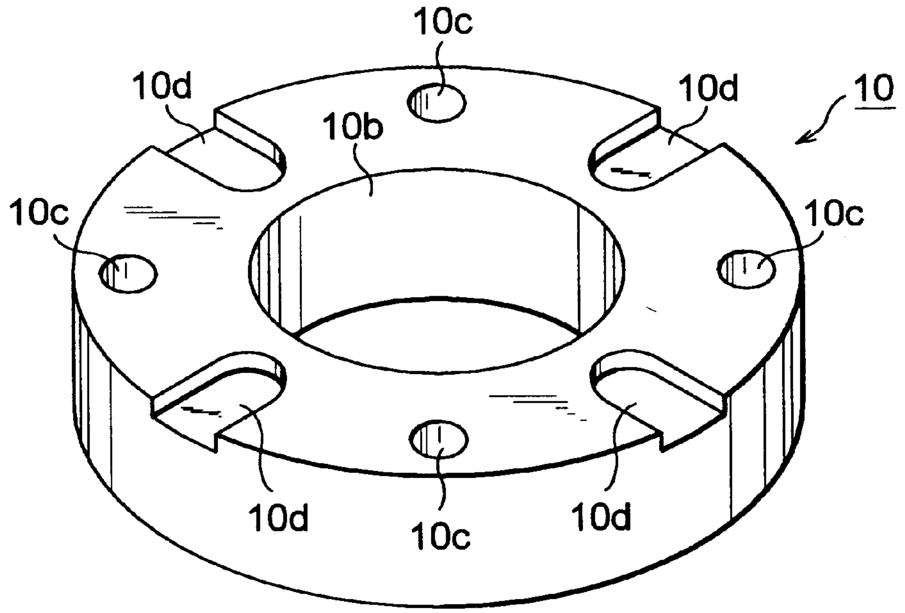
FIG. 7 is a perspective view showing a spacer employed in the ultraviolet detector in accordance with the present invention.

Here, as shown in FIG. 7, four depressions 10*d* respectively opposing the end portions of the cathode pins 15 are formed on the rear face of the spacer 10, thereby preventing the cathode pins 15 from abutting to the spacer 10. Accordingly, the spacer 10 can securely be disposed between the electrodes 6 and 8. Also, as shown in FIGS. 4 and 5, a flange 3*a* is integrally formed like a brim at the lower end of the metal tubular member 3, whereas a flange 5*c* is integrally formed like a brim at the lower end of the metal cylinder 5*b* of the stem 5. The flange 3*a* of the tubular member 3 and the flange 5*c* of the stem 5 can be joined and resistance-welded together.

In the following, a procedure of assembling the ultraviolet detector 1 will be explained with reference to FIG. 5.

First, prepared are the tubular member 3 to which the ultraviolet entrance window 4 has been secured by fusion bonding, and the stem 5 in which the anode pins 14, the cathode pins 15, and the tube 12 are secured to the substrate 5*a*. Then, at the same time when the auxiliary spacer 13 is mounted on the substrate 5*a* of the stem 5, the protruded portion 12*a* of the tube 12 is inserted into the positioning opening 13*a* of the auxiliary spacer 13. Thereafter, the cathode 8 is mounted on the auxiliary spacer 13 such that the cathode pins 15 are inserted into their corresponding positioning holes 8*a* in the cathode 8, and the cathode pins 15 and the brim 11 of the cathode 8 are laser-welded together. As a result, the auxiliary spacer 13 is securely held between the cathode 8 and the stem 5, whereby the position of the cathode 8 is determined.

Further, the insulating portion 10*a* of the spacer 10 is mounted on the brim 11 of the cathode 8, and the anode pins 14 are inserted into their corresponding positioning holes 10*c* in the spacer 10 such that the depressions 10*d* in the spacer 10 align with the end portions of their corresponding cathode pins 15. As a result, the protrusion 9 of the cathode 8 is surrounded by the insulating portion 10*a* of the spacer 10, while the top portion of the protrusion 9 slightly descends from the upper surface of the spacer 10 by a depth which corresponds to the discharging gap C. Thereafter, the planar anode 6 is mounted on the spacer 10 so as to be in close contact therewith, and the anode pins 14 are inserted into their corresponding positioning holes 6*b* in the anode 6. Then, the anode pins 14 are laser-welded to the anode 6. As a result, the spacer 10 is held between the anode 6 and the cathode 8, whereby the discharging gap C of 0.4 mm is securely defined.

Thereafter, the flange 3*a* of the tubular member 3 and the flange 5*c* of the stem 5 are joined together such that the anode 6, the cathode 8, and the like are enclosed within the tubular member 3, and their joints are resistance-welded to complete the sealed vessel 2. Subsequently, the tube 12 is attached to an evacuation unit (not shown), and air is evacuated from the sealed vessel 2 through the tube 12. Then, the whole sealed vessel 2 is heated so as to be baked out. After a predetermined amount of discharged gas is injected from the tube 12 into the sealed vessel 2, the tube 12 is pinch-sealed to complete the ultraviolet detector 1. Such an assembling procedure for the ultraviolet detector 1 is suitable for mass production in particular, though it may be effected by manual labor as well. Namely, the ultraviolet detector 1 can be assembled such that the electrodes 6 and 8 and the spacer 10 are successively superposed on each other and laser-welded together. Accordingly, the assembling steps can be automated and their labor can be saved, thus realizing the product at a lower cost.

In the following, operations of the ultraviolet detector 1 will briefly be explained.

Figure 8:
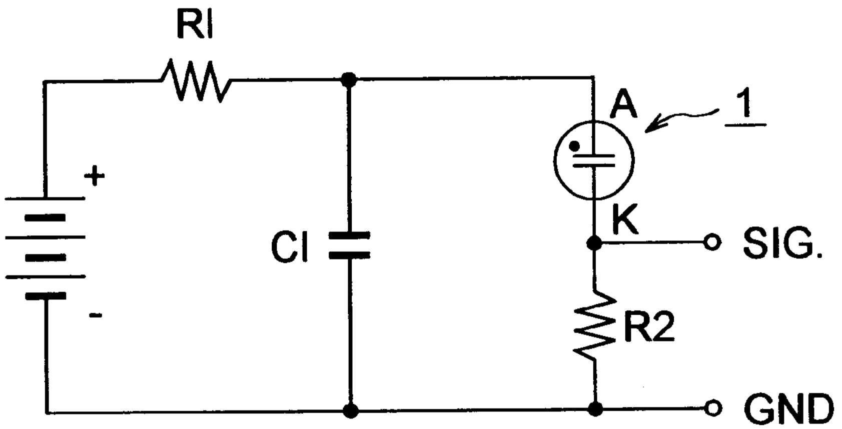
FIG. 8 is a circuit diagram showing a circuit for driving the ultraviolet detector in accordance with the present invention.

As shown in FIG. 8, the anode pins 14 and the cathode pins 15 are connected to a driving circuit (known quenching circuit), and a voltage of about 350 V is applied between the anode 6 and the cathode 8. In this state, when ultraviolet radiation is incident on the ultraviolet-receiving region B on the surface of the cathode 8 from the ultraviolet entrance window 4 through the ultraviolet-transmitting holes 7 of the anode 6, photoelectrons are emitted. These photoelectrons are accelerated toward the anode by the electric field and ionize gas molecules between the electrodes, thereby producing an electron avalanche. A number of cations produced in the avalanche are accelerated to the cathode, and impinged on the cathode may cause the secondary electron emission from the cathode surface. Secondary electrons also accelerated toward the anode and could produce large number of electron avalanches. This process is repeatedly effected, so that the discharge current between the electrodes 6 and 8 rapidly increases. While the charge of this discharge current is supplied by a capacitor C1, the potential of the anode 6 decreases in response to the rapid increase in discharge current, thereby terminating discharge. Generated at both ends of a resistor R2 is a voltage pulse corresponding to a discharge current pulse, which is monitored to detect ultraviolet radiation. The frequency at which pulses are generated is in proportion to the amount of ultraviolet radiation.

Thus, since the ultraviolet detector 1 has the ultraviolet entrance window 4 at the top portion thereof, it has a field of view within the range of 120° to 160° and a sufficient sensitivity within this range, thus making it easier to be applied to a fire alarm and the like. Also, since the tubular member is made of a metal, a highly shock-resistant structure can be attained, thus making it easier to handle. The ultraviolet detector 1, which can detect weak ultraviolet radiation securely and quickly, is applicable to flame detectors for gas oil lighters or matches, combustion monitoring devices for burners, ultraviolet leakage testers, detectors for discharge phenomena, ultraviolet switches, and the like.

In the following, other embodiments of the present invention will be explained.

Figure 9:
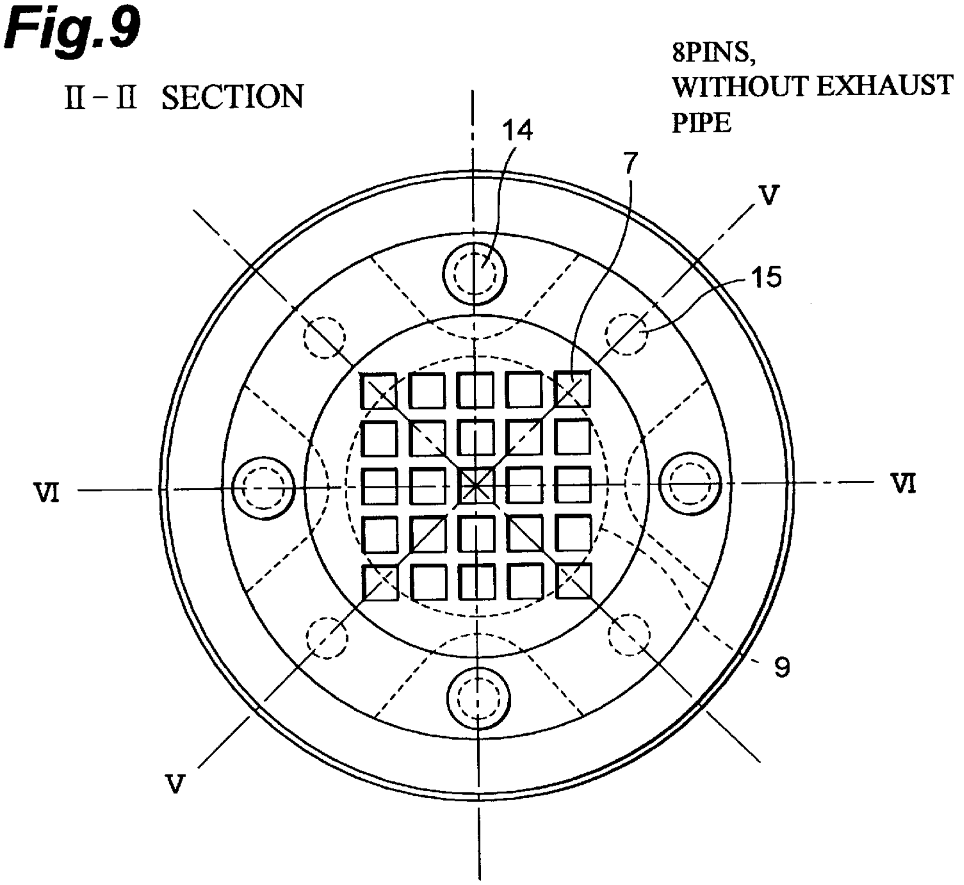
FIG. 9 is a horizontal sectional view showing an ultraviolet detector in accordance with a second embodiment of the present invention.
Figure 10:
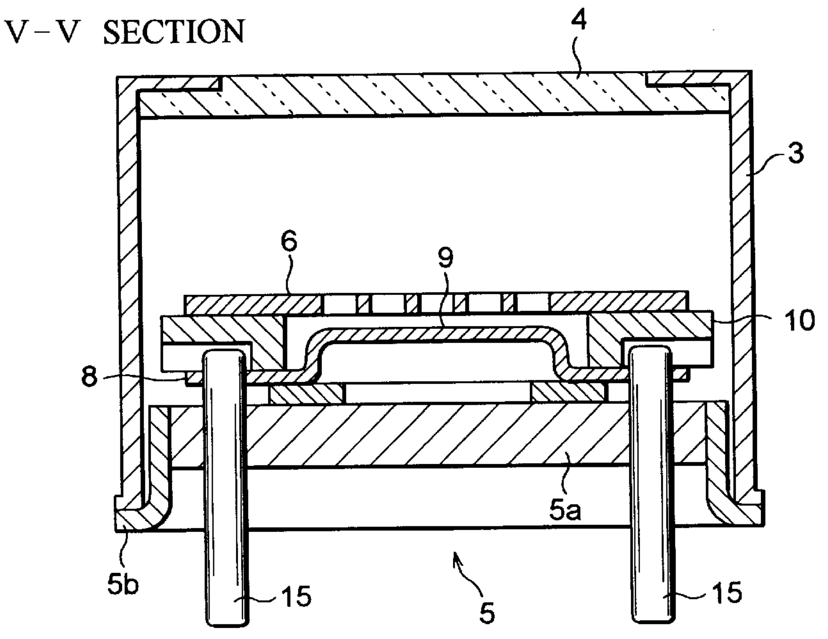
FIGS. 10 and 11 are sectional views of the ultraviolet detector taken along line V—V and line VI—VI of FIG. 9, respectively.
Figure 11:
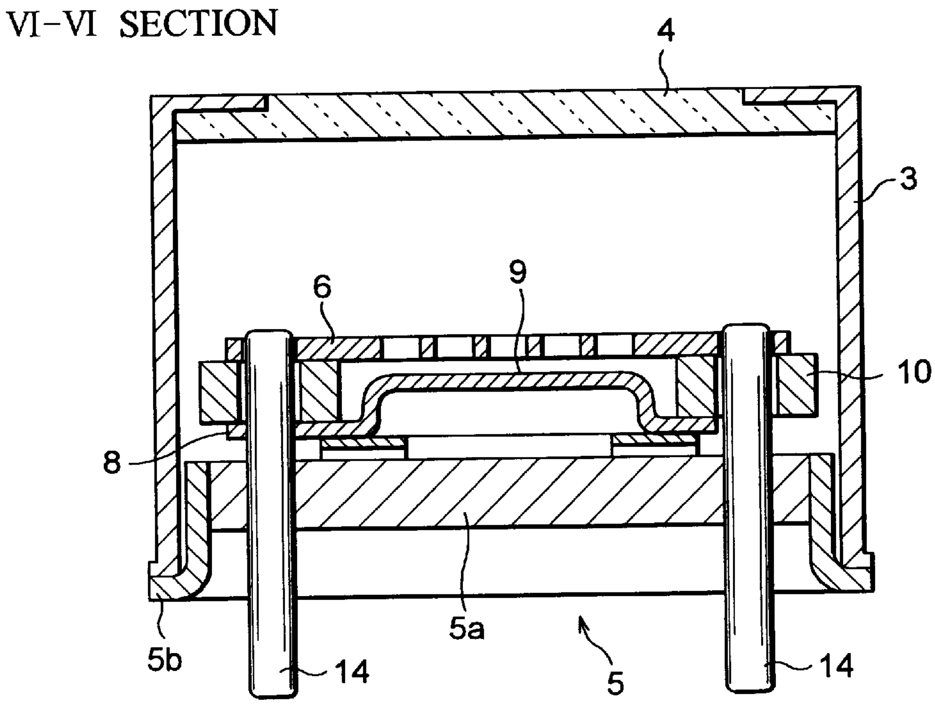

FIGS. 9 to 11 are views showing a second embodiment of the present invention. The second embodiment differs from the first embodiment in that it lacks the tube 12. In the other respects, they are the same. The second embodiment can be manufactured by a method comprising the steps of introducing the tubular member 3 and the stem 5, which have not yet been welded together, into a vacuum chamber; baking out the chamber; filling the chamber with a mixed gas; and then connecting these members to each other by resistance welding technique.

Figure 12:
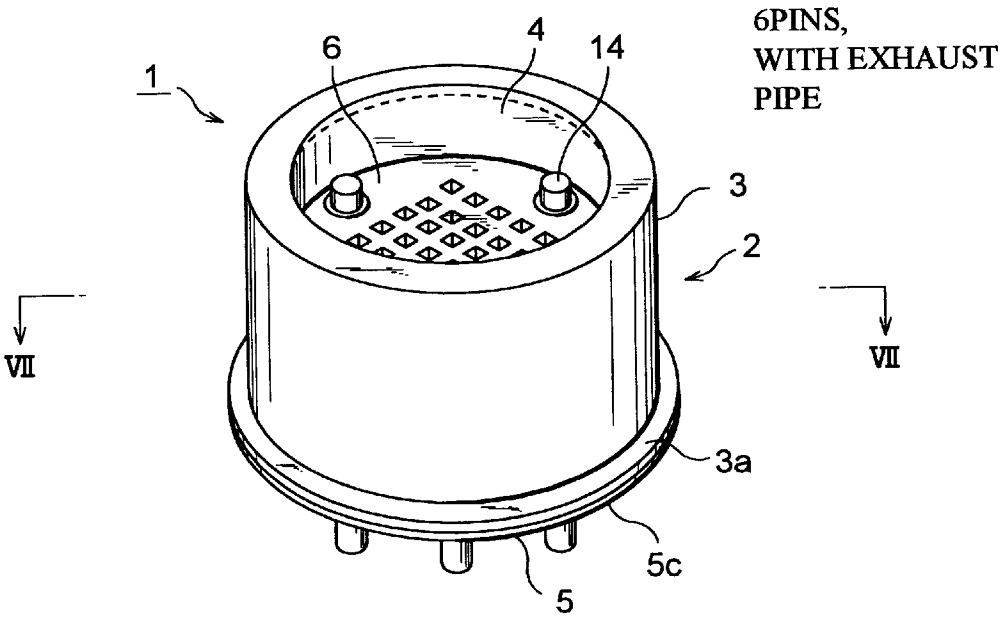
FIG. 12 is a perspective view showing an ultraviolet detector in accordance with a third embodiment of the present invention.
Figure 13:
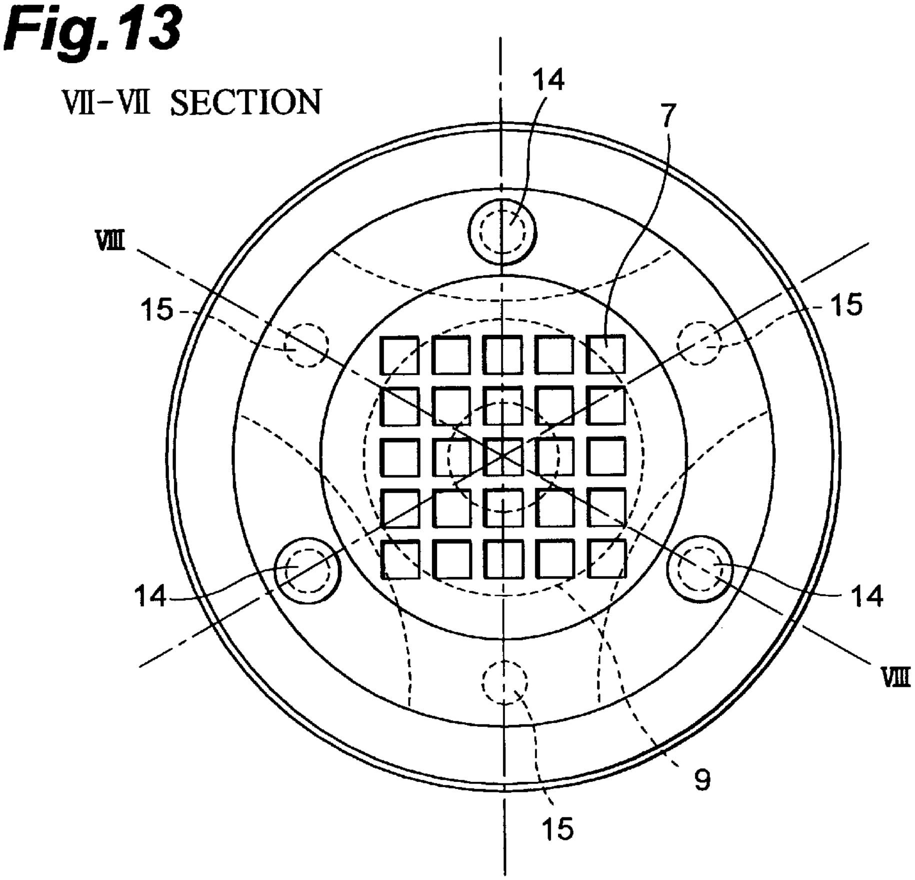
FIG. 13 is a sectional view of the ultraviolet detector taken along line VII—VII of FIG. 12.
Figure 14:
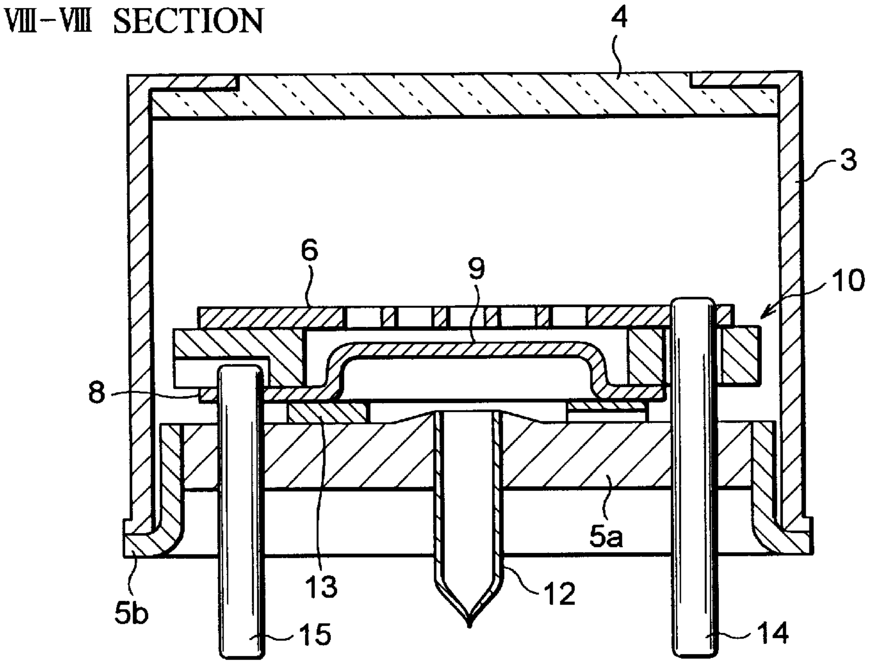
FIG. 14 is a sectional view of the ultraviolet detector taken along line VIII—VIII of FIG. 13.

FIG. 12 is a perspective view showing a third embodiment of the present invention, FIG. 13 is its horizontal sectional view taken along line VII—VII of FIG. 12, and FIG. 14 is its vertical sectional view taken along line VIII—VIII of FIG. 13. In this embodiment, the anode 6 and the cathode 8 are secured to three pieces each of the anode pins 14 and the cathode pins 15, respectively, while the spacer 10 is disposed therebetween. Except for this point, its configuration is the same as that of the first embodiment. Also, in such a configuration, the discharge surfaces of the anode 6 and cathode 8 can be held in parallel with each other with a predetermined gap therebetween. It can clearly be seen that, in order to set spatial positions of discharge surfaces so as to securely attain a predetermined gap, each electrode should be secured to at least three points which do not lie on a single straight line.

Figure 15:
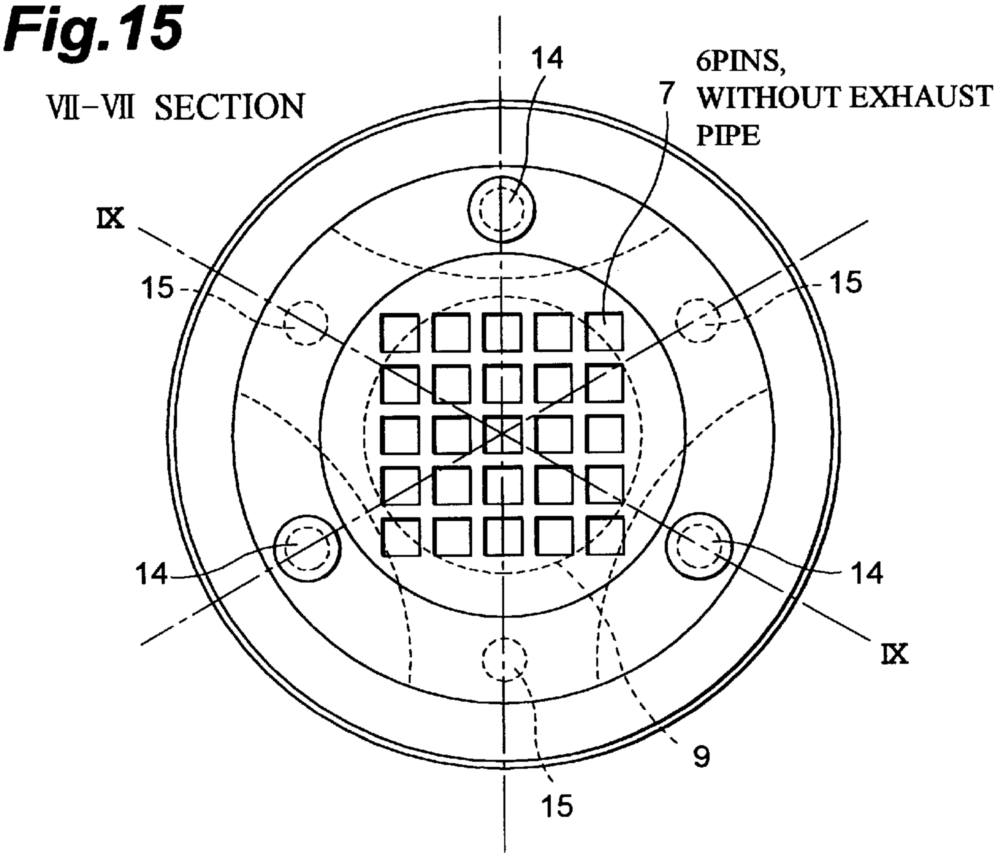
FIG. 15 is a horizontal sectional view showing an ultraviolet detector in accordance with a fourth embodiment of the present invention.
Figure 16:
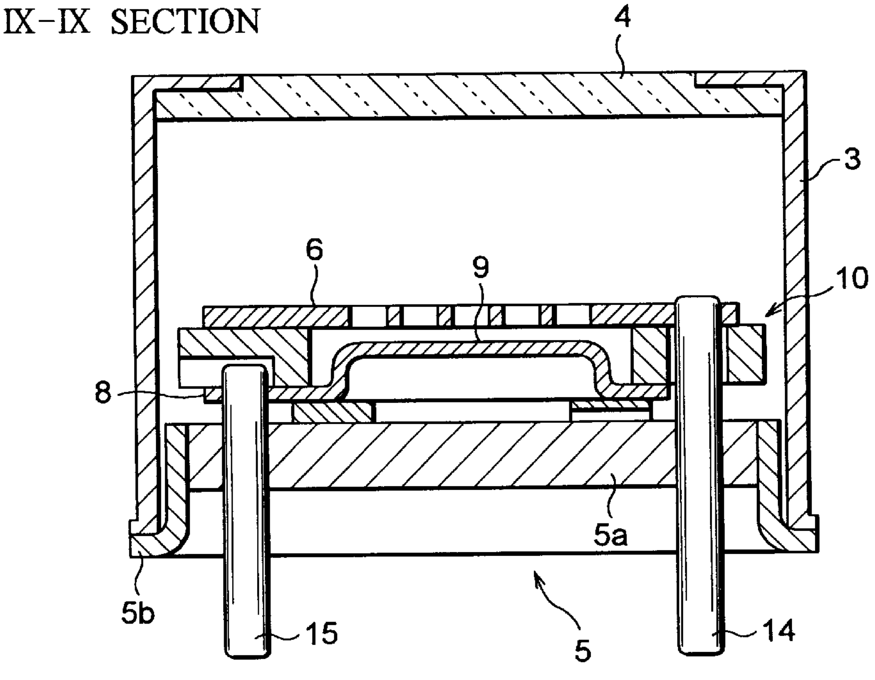
FIG. 16 is a sectional view of the ultraviolet detector taken along line IX—IX of FIG. 15.
Figure 17:
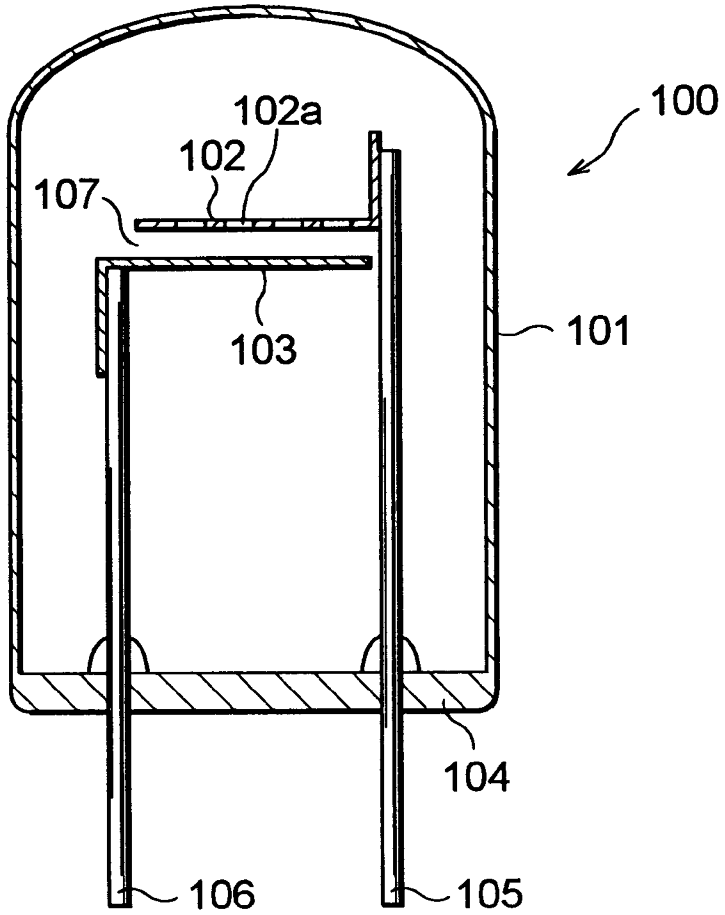
FIG. 17 is a sectional view showing a conventional ultraviolet detector.

FIGS. 15 and 16 are views showing a fourth embodiment of the present invention. In this embodiment, the tube 12 is excluded from the third embodiment. In the other respects, its configuration is the same as that of the above-mentioned third embodiment and will not be explained here.

The present invention should not be restricted to the foregoing embodiments. Though the discharging gap C between the anode 6 and the cathode 8 should be made small, it may appropriately be changed depending on the pressure of discharged gas within the sealed vessel 2, the kind of gas, the magnitude of applied voltage, the sensitivity in ultraviolet detection, and the like.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 255080/1996 filed on Sep. 26, 1996 is hereby incorporated by reference.

What is claimed is:

1. An ultra violet detector comprising:

a sealed vessel enclosing a discharged gas, a metal anode, and a metal cathode, said anode and cathode being disposed close to each other within said sealed vessel to generate a discharge therebetween in response to ultraviolet radiation entering said sealed vessel, wherein said anode is secured to at least three points in said sealed vessel and said cathode is secured to at least three other points in said sealed vessel; and wherein none of the points associated with either of said anode or cathode lie on a single straight line; and an electrically-insulating ring-shaped spacer disposed between said anode and cathode defining relative positions of said anode and cathode with respect to each other, said anode and cathode forming a discharging gap therebetween; and wherein the gap is made smaller than a distance between contacting points between said spacer and said anode and cathode.

2. An ultraviolet detector according to claim 1, wherein a top portion of said sealed vessel is provided with an ultraviolet entrance window, said sealed vessel includes a tubular member made of a metal, and a bottom portion of said sealed vessel is closed with a stem.

3. An ultraviolet detector according to claim 2, wherein said anode is disposed on said ultraviolet entrance window side, said cathode is disposed on said stem side, said anode is formed like a disk having an ultraviolet-transmitting region at a center portion thereof, said cathode has an ultraviolet-receiving region opposing said ultraviolet-transmitting region, said ultraviolet-transmitting region has a plurality of ultraviolet-transmitting holes, and said ultraviolet-receiving region is formed at a top portion of a cup-shaped protrusion adjacent to said ultraviolet-transmitting region.

4. An ultraviolet detector according to claim 3, wherein a center portion of said ring-shaped spacer has an opening into which said protrusion is inserted.

5. An ultraviolet detector according to claim 2, further including an auxiliary spacer disposed between said stem and cathode.

6. An ultraviolet detector according to claim 5, wherein a center portion of said auxiliary spacer is provided with a positioning opening which engages with a protruded portion of a tube projecting from said stem.

7. An ultraviolet detector according to claim 6, wherein, of said auxiliary spacer, a surface on said stem side is provided with a cross-shaped vent hole communicating with said positioning opening.

8. An ultraviolet detector according to claim 2, wherein an anode pin and a cathode pin penetrate through said stem so as to be secured thereto, an edge portion of said anode is provided with a positioning hole for inserting said anode pin, an edge portion of said cathode is provided with a positioning hole for inserting said cathode pin, and an edge portion of said spacer is provided with a positioning hole through which said anode pin penetrates.

9. An ultraviolet detector according to claim 8, wherein said spacer is provided with a depression for preventing an end portion of said cathode pin from abutting thereto.

10. An ultraviolet detector according to claim 2, wherein an outermost periphery of said stem is constituted by a metal cylinder, said metal cylinder being provided with a flange which abuts to an end portion of said metal tubular member.

* * * * *